United States Patent [19]

Buchan et al.

[11] Patent Number: 5,006,869

[45] Date of Patent: Apr. 9, 1991

[54] CHARGED PARTICLE PRINTER

[75] Inventors: W. R. Buchan, Pocasset, Mass.; Robert S. McCallum, Terra Cotta, Canada

[73] Assignee: Delphax Systems, Mississauga, Canada

[21] Appl. No.: 433,110

[22] Filed: Nov. 8, 1989

[51] Int. Cl.[5] .............................................. G01D 15/06

[52] U.S. Cl. .................................................... 346/159

[58] Field of Search ................ 346/159; 400/119, 126; 313/131 R, 219, 220

[56] References Cited

U.S. PATENT DOCUMENTS 4,558,334 12/1985 Fotland .............................. 346/159

*Primary Examiner*—Donald A. Griffin

*Attorney, Agent, or Firm*—Rogers & Scott

[57] ABSTRACT

The invention provides an electrostatic print cartridge for use in placing electrostatically charged dots on a charge receiving surface to build a latent image for subsequent toning. The cartridge includes a rigid spine to prevent the cartridge from bending during construction; a dielectric substrate attached to the spine with driver electrodes arranged in parallel lines between the spine and the dielectric substrate; and finger electrodes arranged on the opposite side of the substrate intersecting the driver electrodes and defining a matrix of apertures aligned with the intersection points of the driver and finger electrodes. The apertures in each finger electrode cover a segment of a complete image and are arranged so that the sequence of creating dots is such that primary dots are laid down separated from one another in each segment and subsequently secondary or intermediate dots are placed in spaces between the primary dots as the segment is filled with dots.

11 Claims, 5 Drawing Sheets

CHARGED PARTICLE PRINTER

BACKGROUND OF THE INVENTION

This invention relates to print cartridges for printers and more particularly to a print cartridge with an improved aperture geometry.

Electrostatic printers receive images in the form of electronically coded information and convert it to an output on a medium such as paper. Typically an electrostatic printer uses a print cartridge with a plurality of discharge sites which can be controlled to place electrostatically charged particles on a charge receiving surface such as a revolving print drum or moving belt to form charged dots which in turn make up a latent image. Typically, the receiving surface is comprised of an electrically conductive substrate coated with a dielectric coating to enable it to hold charged particles generated by the print cartridge.

In the following description, the charge receiving surface will be described for convenience primarily with reference to a drum.

Once the latent image has been formed on the drum, toner is applied to the image and subsequently transferred to the paper and fused at a nip between the receiving surface and a fusing roller. Advantageously, the print drum and fusing roller revolve on axes which subtend an angle of approximately forty-five minutes to aid in fusing the toned image to the paper.

Excess toner is removed from the drum by a scraper and any remaining latent image is then discharged by an erase head before the drum completes a revolution and starts the printing cycle again.

The electrostatic printer offers many advantages including relatively high-speed printing of computer generated images and the flexibility to print additional copies or to select either portrait or landscape images.

One type of print cartridge which has formed the basis for many modern electrostatic printers is described in U.S. Pat. No. 4,155,093 to Fotland et al which issued May 15, 1979. This type of cartridge provides for the generation of charged particles by an electrical gas breakdown in a field between two electrodes separated by a dielectric substrate. Rows of parallel and equally spaced driver electrodes are attached to one side of the substrate and run from one end of the cartridge to the other. Parallel and equally spaced finger electrodes are located on the opposite side of the substrate and extend diagonally across the driver electrodes. The finger electrodes define discharge sites in the form of a matrix of apertures corresponding to the points where driver and finger electrodes cross. An AC voltage may be applied to the electrodes to cause gas breakdown and charged particle production at edge structures associated with the apertures.

An improvement on this cartridge structure is described in U.S. Pat. No. 4,160,257 to Carrish which issued July 3, 1979. This patent teaches the use of a third or screen electrode separated from the finger electrodes by a dielectric layer. The screen electrode and dielectric layer both have a matrix of openings in alignment with the apertures in the finger electrodes. A DC field can be applied to this electrode to provide a lensing action for focusing charged particles generated by the cartridge to produce more precise charged dots on the printing drum.

Electrostatic print cartridges of the type just described are well suited for producing both text and graphics although they do have limitations when producing large filled areas. In particular this type of cartridge tends to produce a series of very small bumps along the leading and trailing edges (with respect to drum rotation) of filled areas. These bumps occur with a spacing equal to the finger electrode spacing and are more pronounced on the trailing edges of images.

In the cartridge structure described above, the apertures in the matrix are arranged in a series of diagonal rows coinciding with the finger electrodes. The apertures in each diagonal row are arranged to produce charged dots on a particular segment of the drum. Charged particle production can be initiated at each aperture as needed to place a charge on a corresponding point on the drum as the drum rotates past the aperture. The arrangement of apertures is such that it is possible to place charged dots anywhere within a selected zone on the circumference of the drum as it rotates past the cartridge to build up any selected image.

The production of print "bumps" by prior art cartridges will now be explained with reference to the placement of charged dots on a discharged drum to produce a latent image on the drum. The dots will oe laid down as the section of the receiving surface to be printed passes the print cartridge with each finger electrode serving to provide dots in a corresponding segment of the drum surface.

Initially, the first dot in each of the segments is placed by the first aperture in each of the rows of apertures. These initial dots are therefore separated from one another by a distance determined by the length of the segment of image to be created by each of the finger electrodes and this in turn is a function of the number of driver lines used in the cartridge. Because these dots are spaced apart, they have no effect on one another. The rotating drum will then advance to a position where the next aperture of each electrode is available to create a dot. These new dots will be placed immediately adjacent the initial dots in their respective image segments. The shape and position of the new dots will be affected by the charge carried by the initial dots and will tend to displace the new dots away from the initial dots.

Subsequent dots are laid down in sequence adjacent the previously created dots causing the segments to grow and the influence of the charges on the previous dots will become more significant as the image grows so that the dots will be shifted away from the desired position.

The last dot in each segment is an exception and will be laid down between the second last dot in that segment and the first dot in the adjacent segment. Consequently it will be squeezed between these dots by the effect of repulsion caused by like charges and forced to overlap above and below the rest of the adjacent dots. This new dot then projects out of alignment of the other dots to create what will be referred to as a "bump". The bump above the line will be referred to as the leading edge bump, and at the end of the image, there will be a trailing edge bump and the creation of this trailing edge bump will be described.

Production of a second line in the image following the first filled line will now be discussed. Because all of the dots in the second line will be located adjacent the previously laid down dots in the first line, the second line will be shifted downwards. The placement of each dot after the first dot in each segment will be affected by both the previously laid down dots in that line and the dots in the line above.

In a similar manner to the preceding case the last dot in each segment must fit between the second last dot in that segment and the first dot in the next segment. This dot will also be repelled by the last dot in the corresponding segment on the previous line. Thus the dot will be surrounded on three sides by like charges and will be forced to overlap beneath the other dots in that line due to the repulsion of like charges. This is the case of the trailing edge bump which projects further from the surrounding dots than a leading edge bump.

Print bumps are not terribly significant for many uses such as producing text and forms. However, for some uses such as the production of high definition graphics, print bumps stand out from the surrounding lines and are undesirable.

Summary of the Invention

The invention provides an electrostatic print cartridge for use in placing electrostatically charged dots on a charge receiving surface to build a latent image for subsequent toning. The cartridge includes a rigid spine to prevent the cartridge from bending during construction; a dielectric substrate attached to the spine with driver electrodes arranged in parallel lines between the spine and the dielectric substrate; and finger electrodes arranged on the opposite side of the substrate interesecting the driver electrodes and defining a matrix of apertures aligned with the intersection points of the driver and finger electrodes. The apertures in each finger electrode cover a segment of a complete image and are arranged so that the sequence of creating dots is such that primary dots are laid down separated from one another in each segment and subsequently secondary or intermediate dots are placed in spaces between the primary dots as the segment is filled with dots.

BRIEF DESCRIPTION OF THE DRAWINGS

The invention will be better understood with reference to the following description and drawings, in which.

DESCRIPTION OF THE PREFERRED EMBODIMENT

Figure 1:
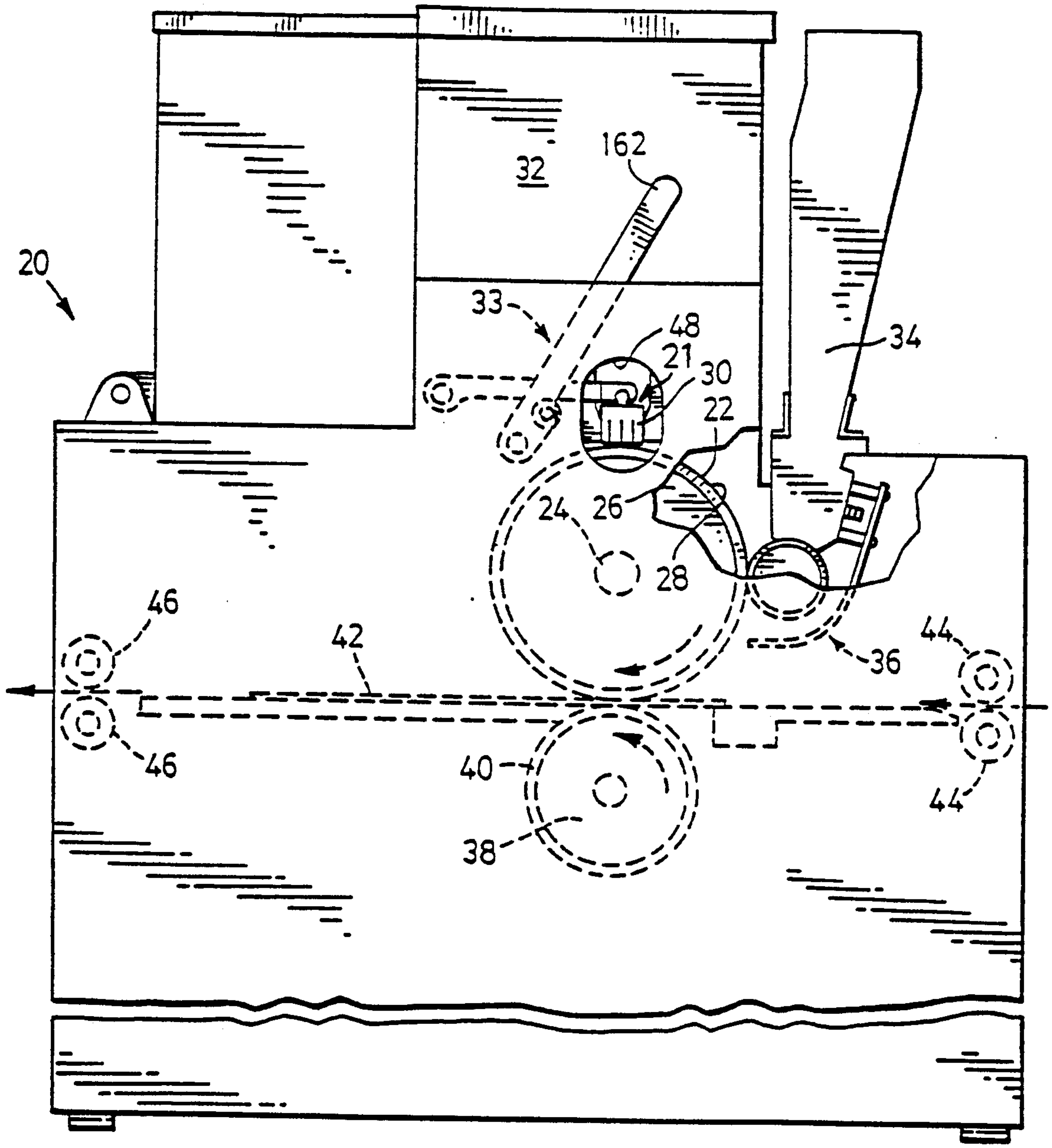
FIG. 1 is a diagrammatic side view of an exemplary printer having an image receptor in the form of a drum and containing a print cartridge according to a preferred embodiment of the invention.

Reference is made first to FIG. 1 which is a somewhat schematic side view of an exemplary printer 20 incorporating a preferred embodiment of cartridge 21 according to the present invention. The invention is particularly useful with this type of printer but could be used with other types of printers having receptor surfaces in the form of belts, etc.

In the exemplary printer, a print drum 22 is mounted for rotation about a shaft 24 and has an electrically conductive core 26 with a dielectric layer 28 capable of receiving a charge image from the print cartridge 21 driven by an electrical control system 32 and held in place by a cartridge mounting assembly 33. As the drum 22 rotates in the direction shown, a latent image is created by the cartridge 21 on the outer surface of the electric layer 28 and comes into contact with toner supplied from a hopper 34 by a feeder mechanism 36. The resulting toned image is carried by the drum 22 towards a nip formed between the drum 22 and a pressure roller 38 having a compliant outer layer 40 positioned in the path of a receptor such as a paper sheet 42 which end is between a pair of feed rollers 44. The pressure in the nip is sufficient to cause the toner to transfer to the paper sheet 42 and, because the axis of the drum 22 and roller 38 lie at an angle of 45 minutes to one another, the combination of pressure and shear causes the toner to be fused to the paper as it is transferred from the drum to the paper. The paper leaves between a pair of output rollers 46.

It is desirable that all operator functions and maintenance be carried out from one side of the printer and for this purpose an access opening 48 is provided in the side of the printer to permit access to the cartridge 21.

Figure 2:
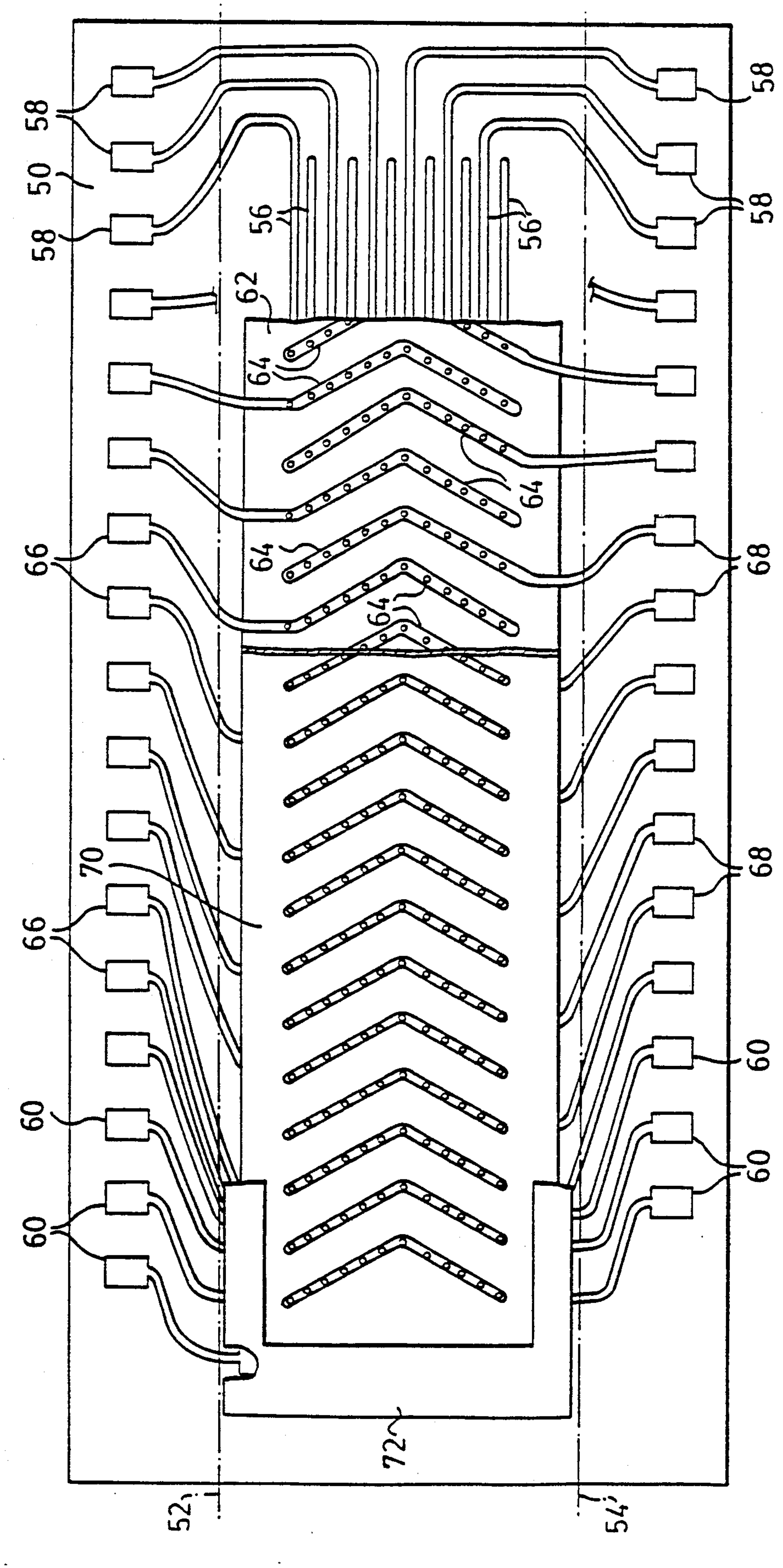
FIG. 2 is a diagrammatic plan view illustrating the cartridge with layers broken away to better show the construction.

Reference is next made to FIG. 2 which illustrates diagrammatically the principle layers of a cartridge, excluding the spine. The view is drawn from the bottom of the cartridge with portions broken away to see the principle layers. In the background is a flexible insulating film 50 which, when it is applied to the spine, is wrapped around the spine by bending generally at the chain-dotted lines 52, 54. The center portion remains exposed below the cartridge while the side portions are wrapped on the sides of the cartridge 21 as seen in FIG. 1.

Working outwardly, the next layer from the insulating film 50 includes driver electrodes 56 which extend longitudinally in parallel and are connected alternately to contacts 58, 60 at opposite ends of the cartridge.

The driver electrodes 56 are covered by a dielectric substrate 62 which separates the electrodes 56 from generally chevron shaped finger electrodes 64 which are connected alternately to contacts 66, 68 positioned at the sides of the cartridge generally in alignment with the contacts 58, 60. All of the contacts between the contacts 58 and 60 are finger electrode contacts.

Each of the electrodes 64 defines a matrix of apertures extending along the length of the chevron shape electrode and positioned for deposition of dots as will be described with reference to FIG. 3. For the moment it is sufficient to understand that each of the openings is associated with a cross over point where that particular opening is positioned at a projected junction with a driver electrode 56 so that activation simultaneously of the driver electrode and the finger electrode will result in a discharge at the opening to provide a dot image on a receptor surface such as the drum described with reference to FIG. 1. This method of depositing dots is conventional in this art.

The finger electrodes 64 are covered by a dielectric layer (not shown) and then by a screen electrode 70 which defines a series of slots aligned with the finger electrodes and is used to assist in shaping the dot images created by the cartridge. For the purposes of the present invention it is sufficient to understand that this screen electrode is preferable in the structure and that whatever the shapes of the finger electrodes, slots are provided in the screen electrode in alignment with the finger electrodes.

Finally, a protective tape covering 72 of insulating material is positioned over the screen 70 and defines a central opening to expose the working part of the screen.

The geometry of the finger electrodes and associated matrix of apertures will now be explained with reference to FIG. 3 which shows three of the finger electrodes and a pattern of dots resulting from activation of these electrodes in combination with an even number of driver electrodes at positions corresponding to letters A to L. The cartridge is in operation to print a solid rectangular area of dots. Each of the finger electrodes is responsible for placing charged dots on a related segment of the drum width. Each of the finger electrodes in this embodiment has a total of 12 apertures which are also identified by the letters A through L for the purposes of explaining the operation of the cartridge. Also, the electrodes in FIG. 3 are numbered 1, 2, and 3 and individual apertures will be identified with reference to the letters and numbers in a X, Y relationship.

Figure 3:
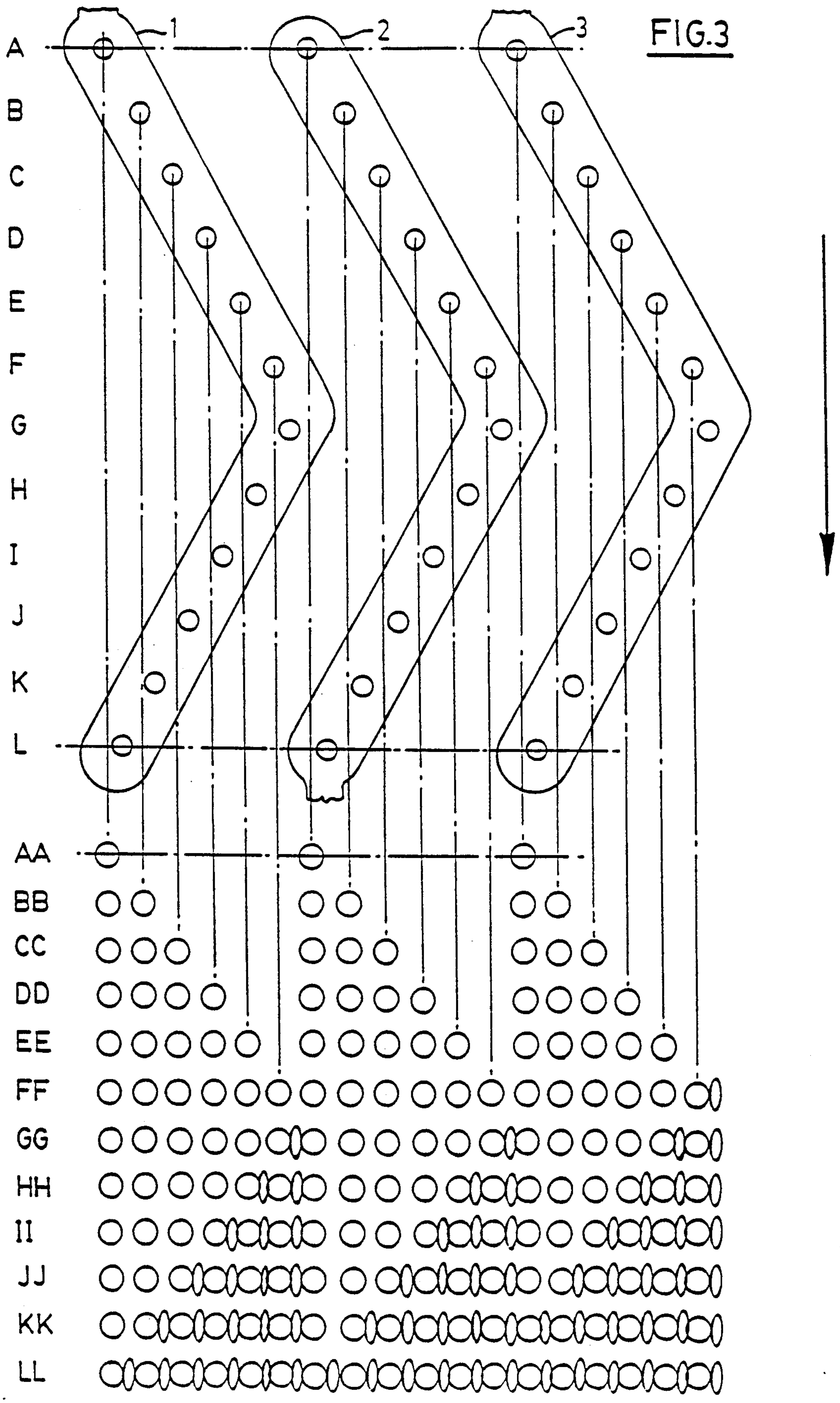
FIG. 3 is a plan view of three exemplary finger electrodes used in the cartridge and aligned with a schematic represention of the sequence of dot production used in creating an image from these electrodes.

FIG. 3 illustrates the placement of dots to create a first line of a solid area of dots. Initially, the first dot of each segment is placed by activation of apertures A1, A2, A3. This is demonstrated at the uppermost line of dots which is indicated by the letters AA. Next, the drum moves to bring the developing line of dots into alignment with apertures B and upon activation, dots indicated at BB result.

The positions of the apertures in the finger electrodes will be referenced to adjacent apertures and to the movement of the receptor surface or drum. Distances between apertures in the direction of motion will be longitudinal measurements, and at right angles to the motion they will be transverse measurements. All of the transverse measurements will represent a whole number of dot locations corresponding to positions where dots are to be placed.

The procedure continues until the dots indicated at FF have been completed where it will be seen that each of the dots is spaced from an adjacent dot so that there will be minimal electrostatic effect on a newly placed dot by an existing dot. The dots placed so far will be referred to as "primary dots" because each dot is separated from an adjacent dot.

The apertures on the electrodes are spaced equally longitudinally and transversely with the exception that the transverse spacing between apertures F and G has been halved when compared with the transverse spacing between the other apertures. Consequently, when apertures G of the electrodes 1 to 3 are energized, dots will be positioned between dots created by energizing apertures F and apertures A. This is indicated in the developing row of dots GG where it will be seen that the new dots are squeezed to some extent by the charge in the existing dots previously laid down. Energizing apertures H results in a similar dot deposition and this continues through to the energizing of apertures L where it will be seen that all of the spaces between the dots and the growing row FF have been filled so that there is now a continuous line represented by these dots. The dots laid down between the primary dots will be referred to as secondary or intermediate dots.

Although the edge of the line is affected by the shape of the dots so that it is not entirely smooth, there is no one increased area of growth for each segment as there was in the prior art bumps. Consequently, the line appears smoother to the eye after toning and represents a more acceptable leading edge of an area of toned image.

The procedure described with reference to FIG. 3 is repeated for the next line and so on to fill an area. Clearly, there will be some irregularity in the trialing edge but this is modified because each of the preceding lines has less effect on the final line then was the case with prior art electrodes.

The reason for the distribution to avoid bumps is found in the distribution of apertures in the electrodes. The spacing between apertures Al and A2 is such that there are an odd number of transverse spaces between the apertures where dots are to be placed in the finished line. Because there are an even number of driver lines A–K and have an even number of apertures in each of the electrodes, there is a space between apertures F1, F2, F3, and the first aperture of the adjacent segments represented by apertures A1, A2, A3, etc. This space can be seen in the growing row of dots FF. It will be evident that variations in the actual positioning of apertures in a given electrode can take place within this general scheme and one such variation is illustrated in FIG. 4.

Figure 4:
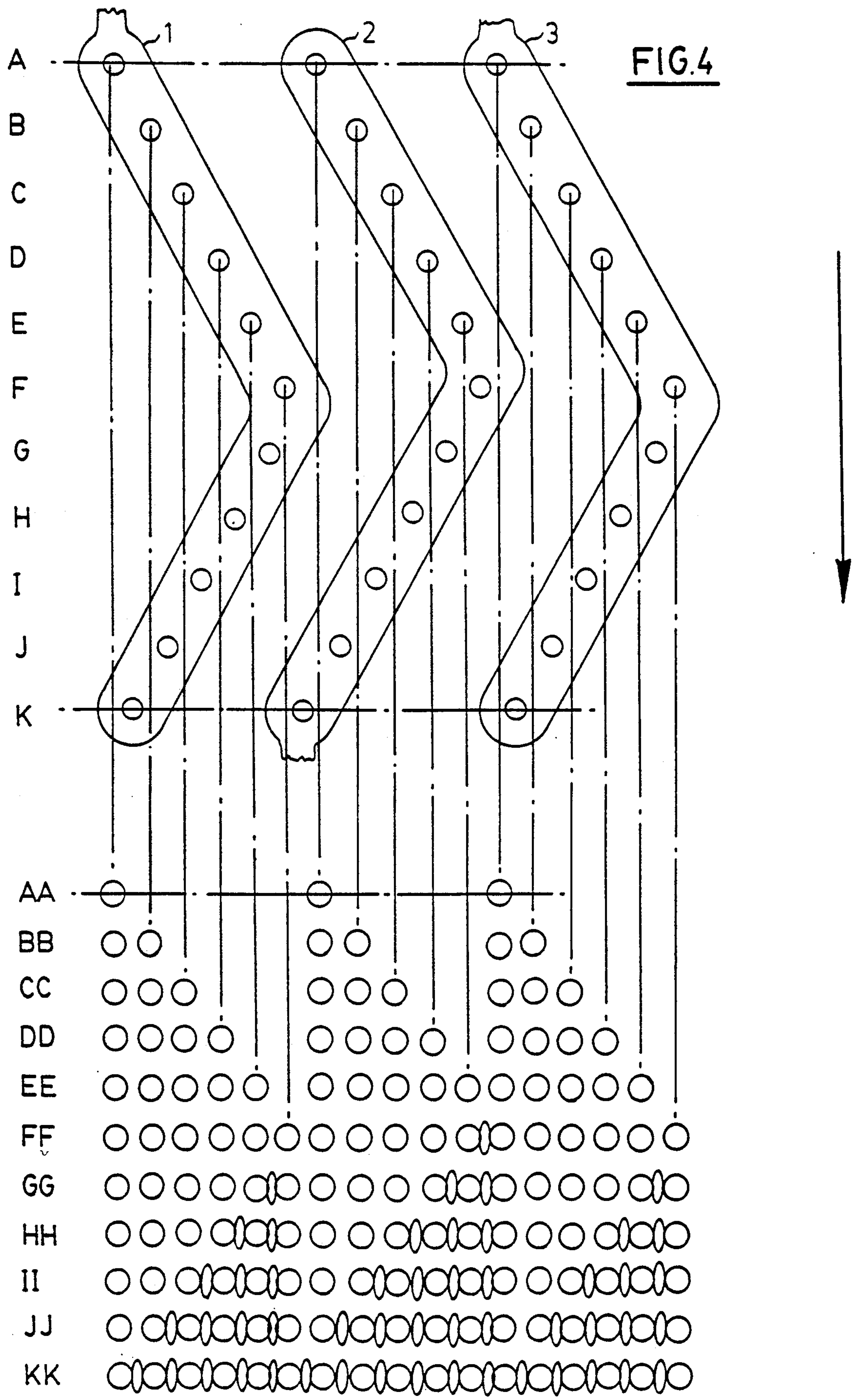
FIG. 4 is a view similar to FIG. 3 and illustrating a different arrangement of apertures in the electrodes and the resulting pattern of dots applied by these electrodes.

As seen in FIG. 4, there are an odd number of driver lines and an odd number of dot spaces between the dots in row AA laid down by apertures A1, A2, and A3. The spaces between these dots are filled differently from the arrangement shown in FIG. 3. Finger electrodes 1 and 3 are similar with apertures A to F spaced equally from one another by two transverse spaces and the following apertures G to K being equally spaced from one another but arranged such that aperture G is spaced from aperture F in the manner described with reference to the electrodes in FIG. 3.

Electrode 2 is different. Apertures A to E are placed in the same fashion as A to E for electrodes 1 and 3, but aperture F is spaced to be effectively in the group of apertures F to K rather than in the group A to E. In other words, there is a difference in transverse spacing between apertures E2 and F2 in a similar fashion to the difference in spacing between the apertures F1 and G1. As a result, the electrodes lay down dots in a fashion shown in FIG. 4 where the first of the intermediate dots is positioned in a gap between existing primary dots is shown in growing row FF. Subsequently, other intermediate dots are positioned by electrodes 1 and 3 as shown in the rows GG through KK with the result that the row KK is a complete line.

It will now be evident that the secondary dots are affected (at least in the first line of dots) equally on both sides and are not displaced out of alignment with the line of primary dots. Of course as the area grows by the addition of second and third lines, etc., the effect will be to change the shapes of the new dots due to the existence of previous lines. Nevertheless, because each secondary dot is being placed between two primary dots, there will be less effect than there was in the prior art on the location of the secondary dot with the result that lines, and areas and edges will be better defined.

Figure 5:
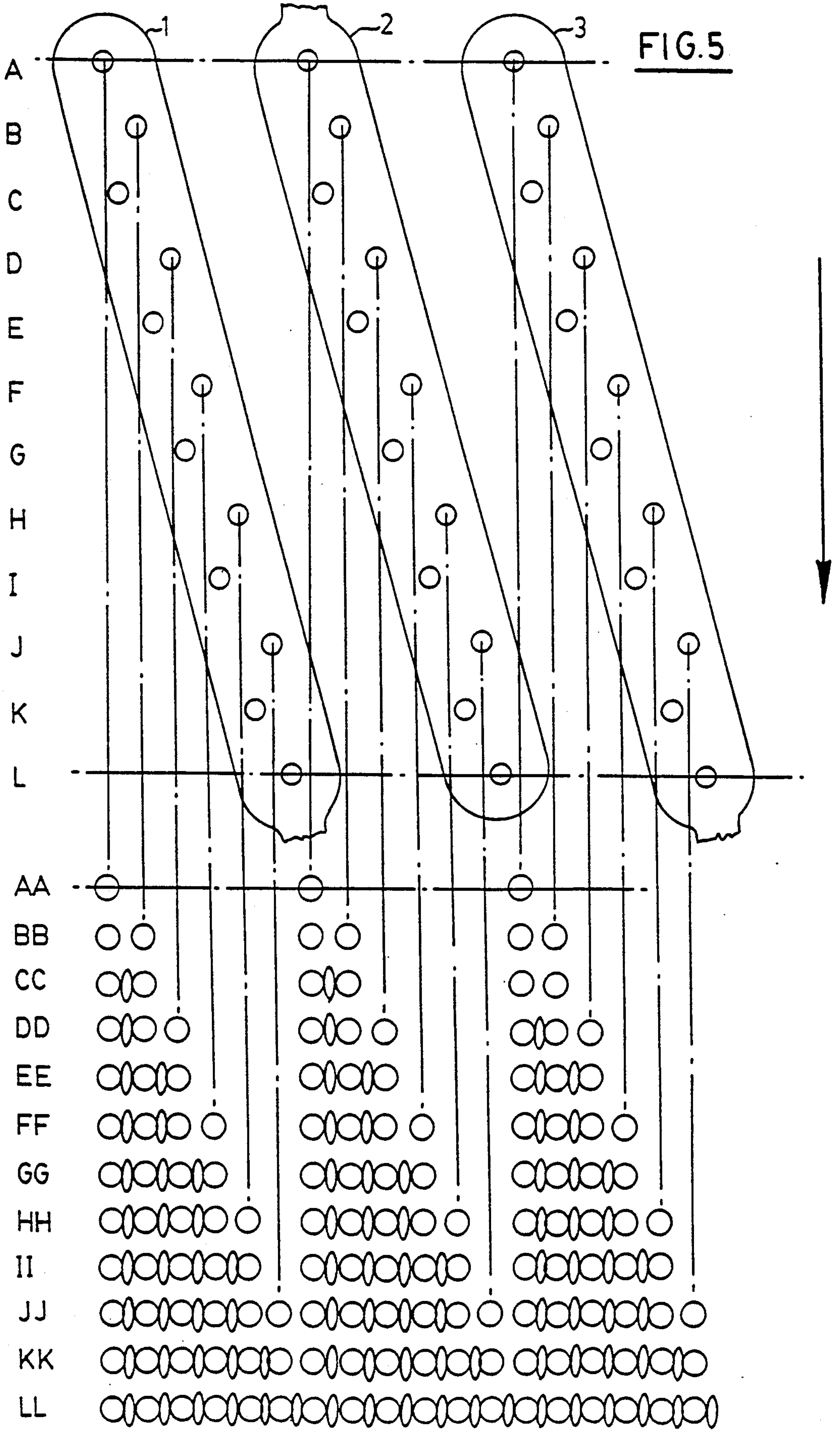
FIG. 5 is also similar to FIG. 3 and illustrates a further form of electode and aperture arrangement.

A further embodiment of electrodes according to the invention and which does not use chevron shaped electrodes is illustrated in FIG. 5. As seen in this figure, electrodes 1, 2, and 3 are straight but adjacent apertures in the electrodes are not aligned. This allows for the placement of two primary dots spaced from one another by one transverse space to be followed by a secondary dot positioned between the primary dots in that space and so on. This can be seen in growing rows AA through LL. First the apertures A1, A2, and A3 are activated to produce row AA. Next, further primary dots are created from apertures B1, B2, and B3 and then, the space between the primary dots is filled by activating apertures C1, C2, and C3 to create the row CC. After energizing apertures D1, D2, and D3 to create row DD, the spaces between dots B1, D1, etc. are filled by energizing apertures E1, E2, and E3 to create row EE. This procedure is continued to complete the line LL with the last intermediate dot being positioned at the ends of each of the segments and in contact with the first primary dots represented by row AA. Again, the spacing between the dots created by apertures A1, A2, and A3 is such that there are an odd number of spaces to be filled.

In general, in any given finger electrode there will be at least one opening positioned with reference to the transverse direction from an adjacent opening by an amount equal to an odd number of transverse dot spaces. Primary dots will be created by these openings and the spaces between these dots filled so that the last dots will be secondary dots between preiously laid dots.

It will now be evident that this invention can take various forms, all of which are within the scope of the invention as claimed.

We claim:

1. A print cartridge for charged particle deposition of latent images on a receptor surface adapted to move longitudinally, the cartridge comprising:

driver electodes extending transversely with respect to said direction;

dielectric means covering the electrodes;

finger electrodes on the dielectric means extending angularly with respect to the driver electrodes, the finger and driver electrodes being separated physically from one another by the dielectric means, the finger electrodes defining apertures where the finger electrodes cross the driver electrodes to thereby define edge structures for charged particle generation upon selectively energizing the driver and finger electrodes to place dots on selected segments of the print cartridge, the segment for each finger electrode being immediately adjacent a segment of another finger electrode and the apertures being arranged in relation to the desired image such that when the image is to be a continuous line of contiguous dots, at least some of the apertures activated in each of the finger electrodes to place a dot in each segment are spaced from transversely from an adjacent aperture in the same finger electrode by an unequal whole number of dot positions, and in which the first dot is a primary dot, the electrodes being operable to energize the apertures in sequence along the length of the finger electrodes to create further primary dots which are separated from one another and then to complete the line by creating secondary dots between the primary dots.

2. A print cartridge as claimed in claim 1 in which the finger electrodes are chevron shaped.

3. A print cartridge as claimed in claim 2 in which there are an even number of driver lines and the finger electrodes are similar.

4. A print cartridge as claimed in claim 3 in which the apertures in the finger electrodes are spaced longitudinally and transversely from one another by similar amounts with the exception that where the two arms of the chevron shaped electrode meet, the adjacent apertures are spaced from one another by half said transverse spacing between the other apertures.

5. A print cartridge as claimed in claim 2 in which there are an odd number of driver electrodes.

6. A print cartridge as claimed in claim 5 in which every other finger electrode is similar.

7. A print cartridge as claimed in claim 5 in which the finger electrodes are of two types arranged alternatly such that every other finger electrode is similar.

8. A print cartridge as claimed in claim 7 in which the apertures in the finger electrodes are spaced longitudinally and transversely from one another by similar amounts with the exception that where the two arms of the chevron shaped electrode meet, the adjacent apertures are spaced from one another by half said transverse spacing between the other apertures.

9. A print cartridge as claimed in claim 1 in which the finger electrodes are straight and the apertures are spaced longitudinally from one another by similar amounts.

10. A print cartridge as claimed in claim 9 in which the spacing between apertures transversely is not between adjacent apertures.

11. A method of creating a latent image on a receptor surface along a transverse line on the receptor surface as the surface moves in a longitudinal direction, the image being made up of a series of dots laid on the surface at discrete dot locations on the line as the surface moves, the method comprising the steps:

providing discharge means operable to discharge charged particles at apertures positioned to create individual discrete dots on the surface and positioned on the line; and actuating the discharge means to sequentially place primary dots on said line as the receptor surface moves longitudinally with each primary dot spaced from adjacent primary dots by an odd number of dot spaces, and to sequentially place secondary dots on said line with each secondary dot positioned at a dot space immediately adjacent and between a pair of primary dots.

* * * * *